May 2, 1933.  R. HOE  1,906,598
SHELLING APPARATUS
Filed July 17, 1930  2 Sheets-Sheet 1
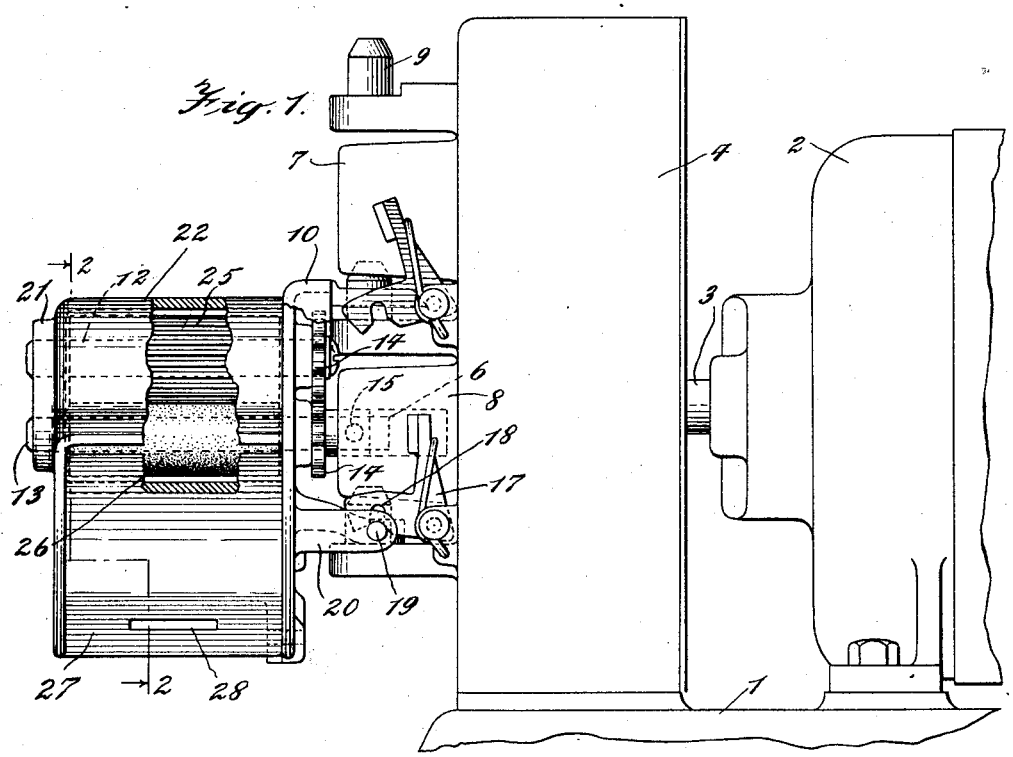
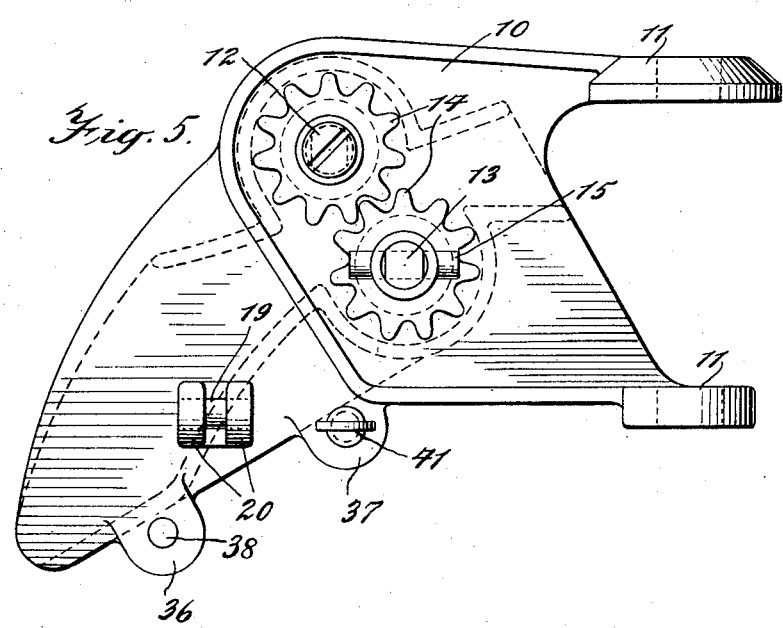
INVENTOR
Robert Hoe
BY
Gifford, Scull & Burgess
ATTORNEYS

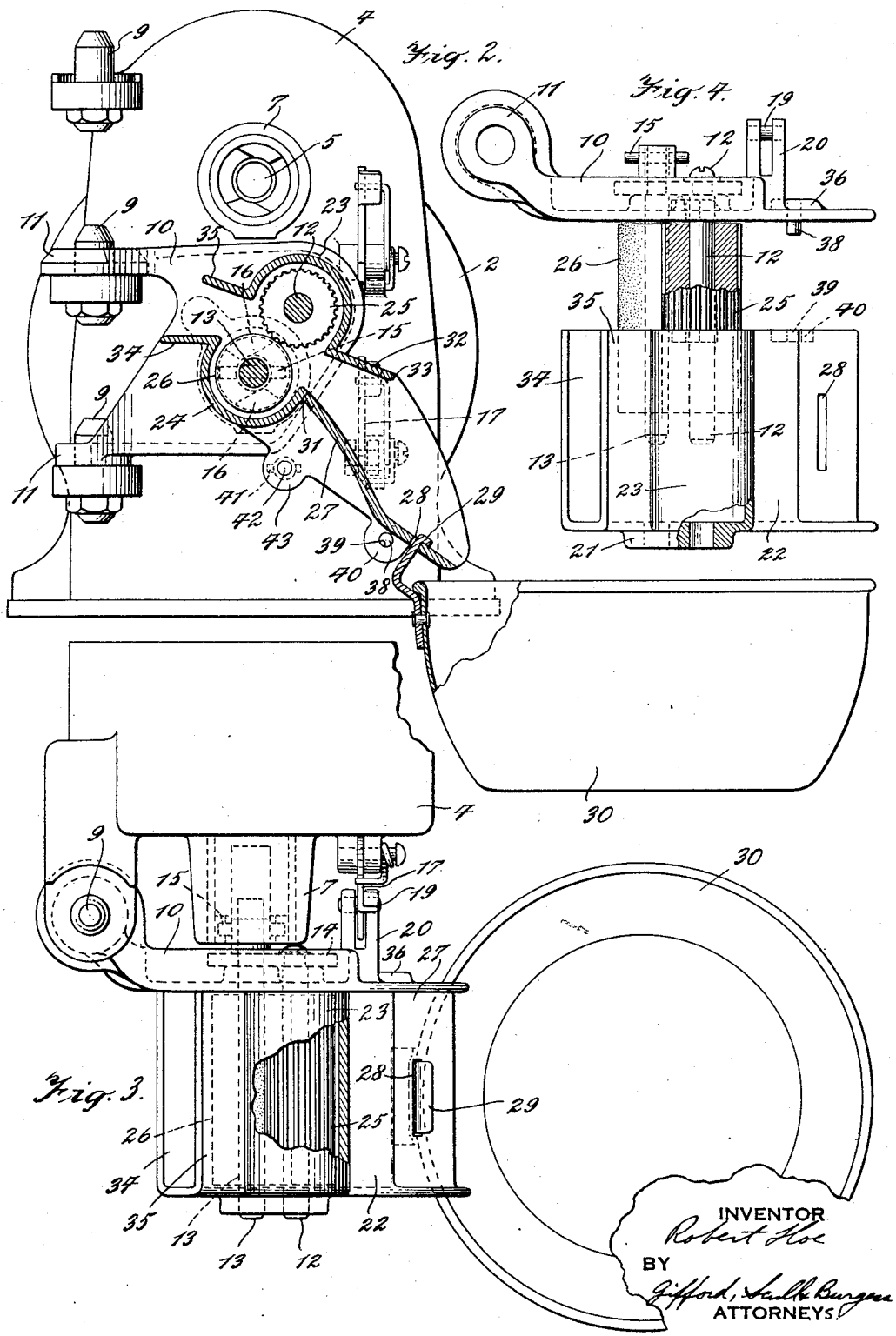

Patented May 2, 1933

1,906,598

UNITED STATES PATENT OFFICE

ROBERT HOE, OF HYDE PARK, NEW YORK

SHELLING APPARATUS

Application filed July 17, 1930. Serial No. 468,493.

This invention relates to a novel and improved form of shelling apparatus, particularly of a type designed for use with a household power unit, and the novel features will be best understood from the following description and the annexed drawings, in which I have shown a selected embodiment of the invention, and in which:—

Fig. 1 is a vertical elevation, parts being broken away, and showing the selected embodiment as applied to a power unit;

Fig. 2 is a view on the line 2—2 of Fig. 1 or Fig. 3, but showing the receptacle or container in place on the apparatus;

Fig. 3 is a plan view, parts being broken away of the structure appearing in Fig. 2;

Fig. 4 is a plan view showing the casing and bracket partly separated from each other;

Fig. 5 is a view of the bracket as viewed from the side next the power unit.

For the purposes of illustration, I have shown the invention as employed in connection with a power unit comprising a base 1 upon which is supported a motor 2 having a shaft 3 which drives a gear train in a gear box 4, this gear train operating shafts 5 and 6 which are journaled respectively in the bosses 7 and 8 of the gear box.

A shelling apparatus is shown as being driven from the shaft 6 and is supported upon two of three hinge pins 9, these pins being so arranged that two of them may support a device in position to be operated by the shaft 5, and two may be used to support another device in position to be operated at another time by the shaft 6.

The apparatus comprises a bracket 10 having hinge ears 11 which are adapted to engage the lower and middle pins 9. Preferably, the bracket is in the form of a flat plate as indicated, and in this plate are journaled the roller shafts 12 and 13, the shaft 12 being shown as above the shaft 13 and parallel thereto. The shafts are shown as provided with intermeshing pinions 14 of the same size, whereby the shafts rotate in unison, and the shaft 13 is provided with a clutch 15, here shown as a pin, which is adapted to cooperate with clutch elements 16 on the shaft 6. By this means, when the bracket is in the position indicated in the drawings, the rollers may be operated by rotation of the shaft 6 which is driven from the shaft 3 through gearing in the box 4, which gearing is not shown as its details form no part of the invention claimed herein.

An example of a suitable arrangement of gearing may be found in my copending application, Serial No. 418,109. When the apparatus is in operative position, the bracket is held by means of a spring-pressed latch 17 having a slot 18 adapted to yieldingly engage a pin 19 on the bracket, this pin being shown as disposed in two spaced ears 20.

The other ends of the shafts 12 and 13 are journaled in the outer wall 21 of a casing 22. This casing is provided with two walls extending inwardly from the wall 21 towards the plate forming part of the bracket 10, and is provided with oppositely disposed semi-cylindrical hoods 23 and 24 which cover the rollers 25 and 26 mounted respectively on the shafts 12 and 13.

As shown, the upper roller 25 is formed of relatively hard material such as metal with a milled or corrugated surface formed with the corrugations extending lengthwise of the roller. The lower roller 26 is formed of soft rubber and of substantially the same diameter as the roller 25, and I have found that with this arrangement of material, and with the surfaces disposed substantially tangent to each other, or slightly touching, excellent results are obtained when shelling pod vegetables such as peas, beans, etc. It will be seen that since the pinions 14 are of substantially the same size, and since the same is true of the rollers 25 and 26, these rollers will rotate in unison at equal peripheral speeds so that pods passing therebetween will not be torn by the fact that one roller is moving faster than the other. I have also found that an improved action is obtained by making the corrugated surface of the roller 25 in the form of alternate grooves and ridges, with the top of each ridge having a relatively broad surface 25', as plainly shown in Figs. 1, 2, 3, and 4, in which it will also be seen that the width of each ridge measured circumferentially of the roller is substantially equal to the width of the groove adjacent the bottom thereof. This broad surface at the edge or top of each ridge, in combination with the soft rubber of the roller with which it contacts, and in combination with the fact that the contacting surfaces are moving at the same speed where they contact, has been found by experimentation to give excellent results in extracting the contents from the pods while not tearing the pods and, consequently, keeping the contacting rollers free of crushed or torn pods.

Extending from the lower roller 26 is an apron 27, in the lower part of which is disposed a slot 28 adapted to receive a hook 29 on a container or receptacle 30 to support the container in a manner more fully described and claimed in my copending application, Serial No. 418,108. It will be seen that the upper end 31 of the apron 27 is slightly beneath the line of contact or throat between the two rollers so as to act as a guide for vegetables inserted between the rollers. A short distance above the point indicated at 31, and in flaring relation to the apron 27, is a downwardly inclined wall or shield 32 which, with the apron 27, forms a relatively long narrow passage, the mouth or outer end of which is a substantial distance from the rollers.

The distance between the apron and the wall 32 is such that any vegetables which are ordinarily being shelled in an apparatus of this character may pass to the rollers without difficulty, but the distance between the rollers and the mouth of the passage is such that it is difficult for a person to accidentally catch the fingers between the rollers. Ordinarily, the fingers will engage the edge 33 of the wall 32 as they feed the parts to the rollers, and this serves not only as a stop to prevent the fingers going through, but also serves as a warning. Referring particularly to Fig. 2, it will be seen that a plane passing through the axes of the two rollers is inclined to the vertical and that the throat or line of contact between the two rollers is on this plane. Similarly, it will be seen that a plane passing through the throat, normal to the plane through said axes, passes substantially midway between the upper edges of the apron 27 and shield 32, which edges are disposed between the respective axes of the rollers and the throat. By this arrangement, a clear passage for the feeding of pods directly to the throat substantially normal to the plane through the axes is provided and, as the pods pass through the throat and the peas or other vegetables are squeezed from the pods, they will be directed downwardly towards the container 30, the shield 32 acting to prevent the contents of the pods from flying outwardly in a generally horizontal direction.

Similarly, a relatively long narrow passage is formed for the discharge of the pods, this passage being formed by the discharge apron 34 and the wall 35 spaced from the apron and slightly flaring with respect thereto, the apron and wall being formed of plates having their inner edges adjacent the rollers and thereby preventing the rollers from carrying pods or large parts thereof beyond these edges.

In operation, the bracket 10 is mounted on hinge pins as described above, and the casing is slid into position by movement in a direction parallel to the roller shafts 12 and 13 until such time as the ends of these shafts are received in their bearings in the wall 21. It will be noted that at least one of these ends is formed as a truncated cone to aid in guiding the shafts into their bearings in the wall 21.

The bracket 10, as best shown in Fig. 5, is provided with depending ears 36 and 37, and the ear 36 carries a dowel pin 38 which is received within a hole 39 in an ear 40 of the casing. A thumb screw 41 may then be inserted through a hole in the ear 37 and screwed into a threaded hole 42 in an ear 43 on the casing. The parts are then securely fastened together and ready to operate when the bracket is swung into position to engage the clutch elements 15 and 16. The vegetables to be shelled may be fed through the passage formed by the apron 27 and wall 32, the vegetables after shelled passing down the apron into the container 30, and the pods passing between the rollers and out along the apron 34. When the shelling operation is finished the apparatus may be removed from the power unit and the thumb screw removed, after which the parts may be separated for cleaning. The result is a device which may be easily and cheaply made, operated, and cleaned, and which during operation is practically fool-proof.

I claim:

1. A shelling apparatus for podded vegetables comprising two cylindrical rollers mounted on substantially parallel axes so spaced that the surfaces of said rollers are in contact with and substantially tangent to each other to form a throat through which pods may pass, means to rotate said rollers in unison at substantially equal peripheral speeds, said rollers being arranged one above the other with the plane passing through the axes of the two rollers inclined to the vertical, an apron inclined downwardly from said throat and having its upper edge disposed adjacent and below said throat and between the throat and the axis of the lower roller, a downwardly inclined shield disposed above said apron and having one edge adjacent and above said throat and between the throat and the axis of the upper roller, said apron and shield being disposed sufficient distances on opposite sides of a plane passing through said throat normal to said first-named plane to provide a passage for the feeding of pods directly to said throat and in a direction substantially normal to said first-named plane, whereby, when a podded vegetable is fed through said passage and into engagement with said rollers as they rotate, the contents of said pod will be squeezed therefrom and directed in a downward direction through the passage, one of said rollers having its surface formed of soft rubber, and the other roller having its surface formed of relatively hard material with alternate grooves and ridges extending generally lengthwise of the roller, and plates extending away from its rollers on the side of said first-named plane opposite the apron and shield, said plates, having edges disposed adjacent said rollers.

2. A shelling apparatus for podded vegetables comprising two cylindrical rollers of approximately equal diameters mounted on substantially parallel axes so spaced that the surfaces of said rollers are in contact with and substantially tangent to each other to form a throat through which pods may pass, means to rotate said rollers in unison at substantially equal peripheral speeds, said rollers being arranged one above the other with the plane passing through the axes of the two rollers inclined to the vertical, an apron inclined downwardly from said throat and having its upper edge disposed adjacent and below said throat and between the throat and the axis of the lower roller, a downwardly inclined shield disposed above said apron and having one edge adjacent and above said throat and between the throat and the axis of the upper roller, said apron and shield being disposed sufficient distances on opposite sides of a plane passing through said throat normal to said first-named plane to provide a passage for the feeding of pods directly to said throat and in a direction substantially normal to said first-named plane, whereby, when a podded vegetable is fed through said passage and into engagement with said rollers as they rotate, the contents of said pod will be squeezed therefrom and directed in a downward direction through the passage, one of said rollers having its surface formed of soft rubber, and the other roller having its surface formed of relatively hard material with alternate grooves and ridges extending generally lengthwise of the roller and with the tops of said ridges presenting relatively broad surfaces to contact with the soft rubber surface on the other roller.

3. A shelling apparatus for podded vegetables comprising two cylindrical rollers of approximately equal diameters mounted on substantially parallel axes so spaced that the surfaces of said rollers are in contact with and substantially tangent to each other to form a throat through which pods may pass, means to rotate said rollers in unison at substantially equal peripheral speeds, said rollers being arranged one above the other with the plane passing through the axes of the two rollers inclined to the vertical, an apron inclined downwardly from said throat and having its upper edge disposed adjacent and below said throat and between the throat and the axis of the lower roller, a downwardly inclined shield disposed above said apron and having one edge adjacent and above said throat and between the throat and the axis of the upper roller, said apron and shield being disposed sufficient distances on opposite sides of a plane passing through said throat normal to said first-named plane to provide a passage for the feeding of pods directly to said throat and in a direction substantially normal to said first-named plane, whereby, when a podded vegetable is fed through said passage and into engagement with said rollers as they rotate, the contents of said pod will be squeezed therefrom and directed in a downward direction through the passage, the lower roller having its surface formed of soft rubber and the upper roller having its surface formed of metal with alternate continuous grooves and ridges extending lengthwise of the roller, and the tops of said ridges presenting relatively broad surfaces to contact with the soft rubber surface on the lower roller.

ROBERT HOE.